(12) United States Patent
Ohmori et al.

(10) Patent No.: US 7,386,198 B2
(45) Date of Patent: Jun. 10, 2008

(54) OPTICAL WAVEGUIDE DEVICE

(75) Inventors: Yasuhiro Ohmori, Kawasaki (JP);
Shinji Maruyama, Yokohama (JP);
Tetsuo Ishizaka, Kawasaki (JP);
Masaharu Doi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/248,232

(22) Filed: Oct. 13, 2005

(65) Prior Publication Data

US 2006/0051011 A1   Mar. 9, 2006

Related U.S. Application Data

(63) Continuation of application No. PCT/JP03/04845, filed on Apr. 16, 2003.

(51) Int. Cl.
*G02B 6/12* (2006.01)

(52) U.S. Cl. .............................. 385/14; 385/31; 385/48

(58) Field of Classification Search ...................... None
See application file for complete search history.

(56) References Cited

U.S. PATENT DOCUMENTS 6,668,103 B2   12/2003   Hosoi
6,819,840 B2 *  11/2004  Tohgoh et al. ................. 385/49
2001/0009594 A1   7/2001   Hosoi
2005/0105848 A1   5/2005   Yamada et al.

FOREIGN PATENT DOCUMENTS

| JP | 7-56036 | 3/1995 |
| JP | 11-167032 | 6/1999 |
| JP | 2001-209018 | 8/2001 |
| JP | 2001-281507 | 10/2001 |
| JP | 2002-182050 | 6/2002 |

\* cited by examiner

*Primary Examiner*—Sung H Pak
(74) *Attorney, Agent, or Firm*—Staas & Halsey LLP

(57) ABSTRACT

The present invention has an object to provide an optical device capable of leading out a light propagated through an optical waveguide to a desired substrate side face while maintaining the sufficient power of the light, within a range of limited substrate size. To this end, according to the optical device of the present invention, a groove is formed in the vicinity of an end portion on the optical output side of the optical waveguide, on the substrate on which the optical waveguide is formed, a side wall of the groove is used as a reflecting plane, the light output from the optical waveguide is reflected by the reflecting plane, and the reflected light is emitted from the desired substrate side face.

10 Claims, 15 Drawing Sheets

(A)

(B)

(C)

B - B' CROSS-SECTION

EQUIVALENT REFRACTIVE INDEX PROFILE
OF CURVED WAVEGUIDE

CONVENTIONAL CURVED WAVEGUIDE
( Rc = 1mm, w = 7μm, n = 2.2 )

CURVED WAVEGUIDE IN PRESENT INVENTION
( Rc = 0.5mm, w = 5μm, n' = 1.0 )

DIAGRAM FOR EXPLANING PROBLEMS IN CONVENTIONAL BUTT JOINT TYPE OPTICAL WAVEGUIDE DEVICE (A)

(B)

DIAGRAM FOR EXPLAINING PROBLEMS
IN CASE CURVED WAVEGUIDE IS APPLIED (A)

(B)

DIAGRAM FOR EXPLAINING INFLUENCE
OF CHIPPING ON MONITOR LIGHT

DIAGRAM FOR EXPLAINING MOUNTING METHOD
OF LIGHT RECEIVING ELEMENT FOR MONITOR LIGHT

OPTICAL WAVEGUIDE DEVICE

This application is a continuation of PCT/JP03/04845, filed on Apr. 16, 2003.

BACKGROUND OF THE INVENTION

1. Field of the Invention

The present invention relates to an optical waveguide device used for an optical communication system, and in particular, to a structure of an optical waveguide effective for the miniaturization of an optical circuit for monitoring the optical output power.

2. Description of the Related Art

An optical waveguide device is a device realizing various functions using an optical waveguide which confines a light within a high refractive index portion formed in a dielectric medium to propagate the light. For example, an optical waveguide device, which constitutes a Mach-Zehnder interferometer using a dielectric material, such as lithium niobate (LiNbO$_3$: to be referred to as LN hereunder), is popularly used as an optical modulator, an optical switch, a variable optical attenuator or the like, since it has an extremely high electro-optic constant and has a response speed higher than that of a device having a thermal optic (TO) effect.

However, there has been known that the above described optical waveguide device using the dielectric substrate of LN or the like has the potentiality of occurrence of a phenomenon called the temperature drift in which an operating point is shifted due to a temperature change or a phenomenon called the DC drift in which the operating point is shifted by applying a direct current. When the operating point is shifted due to the occurrence of the temperature drift or the DC drift, an optical output characteristic of the optical waveguide device are fluctuated. Therefore, in the optical modulator for example, the modulation cannot be performed under a constantly fixed condition.

To be specific, the optical output power of the Mach-Zehnder optical modulator is changed in accordance with $\cos^2(\Delta\phi/2)$. The above described parameter $\Delta\phi$ is a phase-change amount given by an interaction section in the Mach-Zehnder interferometer, and is represented by a relationship of $\Delta\phi=\{\pi\cdot\mathrm{ne}^3\cdot\gamma_{33}\cdot l/(\lambda\cdot d)\}\cdot V$ in the case where the LN substrate of Z-cut is used. In this relationship, ne is a refractive index of the optical waveguide, $\gamma_{33}$ is an electro-optic constant, l is the length of each of electrodes disposed on two parallel optical waveguides, $\lambda$ is an optical wavelength, d is a distance between the electrodes, and V is an applied voltage. The optical output power characteristic of the optical modulator is represented by a curve as shown in FIG. 19, provided that the horizontal axis indicates the applied voltage V.

In the optical modulator as described above, it is desired that the operating point is set to be in an intermediate state between the ON and the OFF when the applied voltage to the electrodes is 0V. However, an actual operating point is often deviated from a desired operating point due to a manufacturing error or various stresses. In order to solve this deviation of the operating point, it is typical that the operating point is adjusted to the desired operating point by applying a direct-current bias voltage. However, the operating point adjusted by the DC bias voltage is shifted due to the above described DC drift. Therefore, in order to stably realize the desired operating point, it is necessary to always monitor the optical output power to control the DC bias voltage based on the monitoring result. This monitoring of the optical output power is not limited to the case where the optical waveguide device is used as the optical modulator, and is necessary to adjust an optical attenuation amount corresponding to the temperature change or the like, in the case where the optical waveguide device is used as the variable optical attenuator of Mach-Zehnder type for example.

For coping with the above described necessity of the optical output power monitoring, heretofore, there has been proposed a technology in which a light receiving element for monitoring the optical output power is disposed in the optical waveguide device (refer to literature 1: Japanese Unexamined Patent Publication No. 2002-182050).

As the conventional optical waveguide device, there has been known the device of a configuration in which a main signal light emitted from an end face of the optical waveguide is led to an output optical fiber via a lens coupling system or the device of butt joint type in which the end face of the optical waveguide is directly abutted with the output optical fiber. In the configuration using the lens coupling system, since there exists a required space between a substrate side face from which the main signal light is output and the lens coupling system, of the optical waveguide device, the light receiving element for monitoring the optical output power can be arranged by utilizing this space, and accordingly, it is possible to receive a sufficient monitor light.

On the other hand, in the case of the device of butt joint type, since the output optical fiber is extremely thin, the intensity thereof is insufficient if the fiber is simply adhered to the end face of the optical waveguide. Therefore, as shown in (A) of FIG. 20 for example, it is necessary to fix an output optical fiber 110 to an end face of an optical waveguide 101A on the main signal light output side, using a fiber fixing member 120 such as a V-groove fiber block, glass ferrule or the like. In the configuration using this fiber fixing member 120, if a light receiving element 130 for monitoring the optical output power is arranged on the rear side (opposite side to the optical waveguide device) of the fiber fixing member 120, the fiber fixing member 120 hinders the light receiving element 130 from sufficiently receiving a monitor light emitted from an optical waveguide 101B on the monitoring side. In order to avoid such a situation, as shown in (B) of FIG. 20 for example, the fiber fixing member 120 needs to be formed in a complicated shape. The reinforcing capillary shown in the literature 1 is considered to be one example of the fiber fixing member of more complicated shape. The complexity of the fiber fixing member has a problem of the cost rise of the optical waveguide device.

As one measure for solving the problem in the above butt joint type configuration to reliably monitor the optical output power, it is effective to lead out the monitor light from a substrate side face (side face positioned on the front side or the back side in the configuration specifically shown in FIG. 20) different from the substrate side face from which the main signal light of the optical waveguide device is output. However, in order to realize such a configuration, it is necessary to solve the following problems.

As shown in FIG. 21 for example, a first problem is the reflection and radiation loss on the substrate side face in the case where the monitor light is led out using a curved waveguide. Namely, considering the LN modulator as a specific example, the width w of a substrate 100 of the normally used LN modulator is about 1 mm to 2 mm. Therefore, in order that the light propagated through a curved waveguide 101B on the monitoring side is led out at an angle at which the light is not totally reflected by the substrate side face, the curvature radius Rc of the curved waveguide 101B needs to be set to around 1 mm to 2 mm. On the other hand, the curvature radius Rc of 30 mm or above is necessary to avoid an occurrence of the radiation loss in the curved waveguide 101B. Therefore, as shown in (A) of FIG. 21, if the curvature radius Rc of 30 mm or above is ensured in order to avoid the radiation loss in the curved waveguide 101B, the monitor light is totally reflected by the substrate side face, and also the substrate size is not made to be larger. Further, as shown in (B) of FIG. 21, if the curvature radius Rc of the curved waveguide 101B is set to 2 mm or less in order to prevent the total reflection by the substrate side face, the monitor light is radiated to the outside of the waveguide, in the halfway of the curved waveguide 101B. Accordingly, it is hard to receive the sufficient monitor light only by simply forming the curved waveguide.

As shown in FIG. 22 for example, a second problem is the difficulty of receiving the monitor light caused by the chipping which is generated on the surface of the substrate. Namely, a chip forming the LN modulator or the like is obtained by cutting out the substrate material by utilizing a dicing apparatus. However, when the chip is cut out, the irregularity of several ten μm is generated on the top surface or the bottom surface of the chip. This irregularity is called the chipping. The LN modulator chip is provided with the optical waveguide which is formed on the top surface of the chip by the diffusion treatment of Ti or the like. Therefore, if the chipping is generated on the substrate side face from which the monitor light is led out, it becomes difficult to obtain the sufficient monitor light. Accordingly, it is necessary to take the countermeasure against the chipping on the substrate side face from which the monitor light is extracted.

A third problem is the difficulty of reliably mounting the light receiving element for receiving the monitor light. Namely, as one of methods of mounting the light receiving element for receiving the monitor light, there is considered a method of attaching the light receiving element to the substrate side face from which the monitor light is led out. However, since the size of the light receiving element is 300 μm or above, if the light receiving element is attached to the substrate side face in the case where the optical waveguide is formed on the upper portion of the substrate as described in the above, the light receiving element runs off the top surface of the chip as shown in FIG. 23. Therefore, it becomes extremely difficult to attach the light receiving element, and consequently, problems inclusive of the reliability occur.

SUMMARY OF THE INVENTION

The present invention has been accomplished in view of the above respective problems, and has a first object to provide an optical waveguide device capable of leading out a light propagated through an optical waveguide from a desired substrate side face while maintaining the sufficient power of the light, within a range of the limited substrate size. Further, the present invention has a second object to provide an optical waveguide device in which the chipping generated on the substrate surface is suppressed. Moreover, the present invention has a third object to provide an optical waveguide device capable of reliably mounting a light receiving element, which receives a light led out from a substrate, to the substrate.

In order to achieve the above objects, according to one aspect of an optical device in the present invention, in an optical device comprising: a substrate; an optical waveguide formed on the substrate; a groove formed in the vicinity of the optical waveguide, having a reflecting plane on a sidewall, slanted to a direction vertical to a surface of the substrate; wherein a light output from the optical waveguide is reflected by the reflecting plane, and emitted from a side face of the substrate.

In the optical device of the above configuration, the light output from the optical waveguide formed on the substrate is reflected by the reflecting plane of the groove so that a propagation direction of the light is changed over, and the reflected light is propagated through the substrate to be emitted from the substrate side face. As a result, the problems of the reflection and the radiation loss on the substrate side face in such a case where the above described curved waveguide is used can be avoided, and thus it becomes possible to lead out the light of sufficient power to a desired substrate side face without getting the substrate size larger.

The above described optical device may be configured such that a light reflected by the reflecting plane propagates along the substrate surface, to a direction deviated to the underside of the substrate surface. As a result, even if the irregularity (chipping) is generated on the surface in the vicinity of the substrate side face from which the light propagated through the optical waveguide is emitted, since the light is emitted from the substrate side face below the chipping, it becomes possible to avoid the reduction of the optical power due to an influence of the chipping.

According to another aspect of the optical device in the present invention, in an optical device comprising: a substrate; an optical waveguide formed on the substrate; a curved waveguide reaching a substrate side face, on a portion of the optical waveguide; a groove portion positioned at least on the radially outside of the curved waveguide and formed along a longitudinal direction of the curved waveguide; wherein a refractive index within the groove portion is set to be lower than a refractive index of a portion other than the optical waveguide on the substrate.

In the optical device of the above configuration, a light propagated through the optical waveguide passes through the curved waveguide to be emitted from a desired substrate side face. On the position at least radially outside of the curved waveguide, the groove portion having the refractive index lower than the refractive index of the substrate is formed along the longitudinal direction, so that the radiation loss of the light propagated through the curved waveguide is suppressed due to a light confining effect by this groove portion. As a result, even if the curved waveguide of small curvature radius is used, it becomes possible to lead out the light of sufficient power to the desired substrate side face.

Further, the above described optical waveguide device may be configured such that a block member preventing the generation of the chipping on the substrate surface is provided on an upper portion of the substrate side face from which the light propagated through the curved waveguide is emitted. As a result, it becomes possible to avoid the reduction of the optical power due to the influence of the chipping. Further, the configuration may be such that a light receiving element for receiving the light emitted from the substrate side face is attached to the substrate side face by utilizing the above described block member. Thus, it becomes possible to readily and reliably perform the mounting of the light receiving element to the substrate side face.

Moreover, a further aspect of the optical waveguide device in the present invention comprises: a first optical waveguide formed on a substrate; a block member disposed on the first optical waveguide at a position above an end face of the substrate; and a second optical waveguide which is branched from the first optical waveguide, and also has an end portion thereof at an end face which is different from an end face of the substrate, on which an end portion of the first optical waveguide is positioned, and also under the block member.

In the optical waveguide device of the above configuration, since the generation of the chipping on the substrate end face on which the end portion of the first optical waveguide is positioned, and the generation of the chipping on the substrate end face different from the substrate end face on which the end portion of the first optical waveguide is positioned, on which the end portion of the second optical waveguide is positioned, are respectively prevented by the common block member, it becomes possible to suppress the influence of the chipping on the light output from each of the first and second optical waveguides with a simple configuration.

The other objects, features and advantages of the present invention will be apparent from the following description of the embodiments with reference to the accompanying drawings.

DETAILED DESCRIPTION OF THE INVENTION

Figure 1:
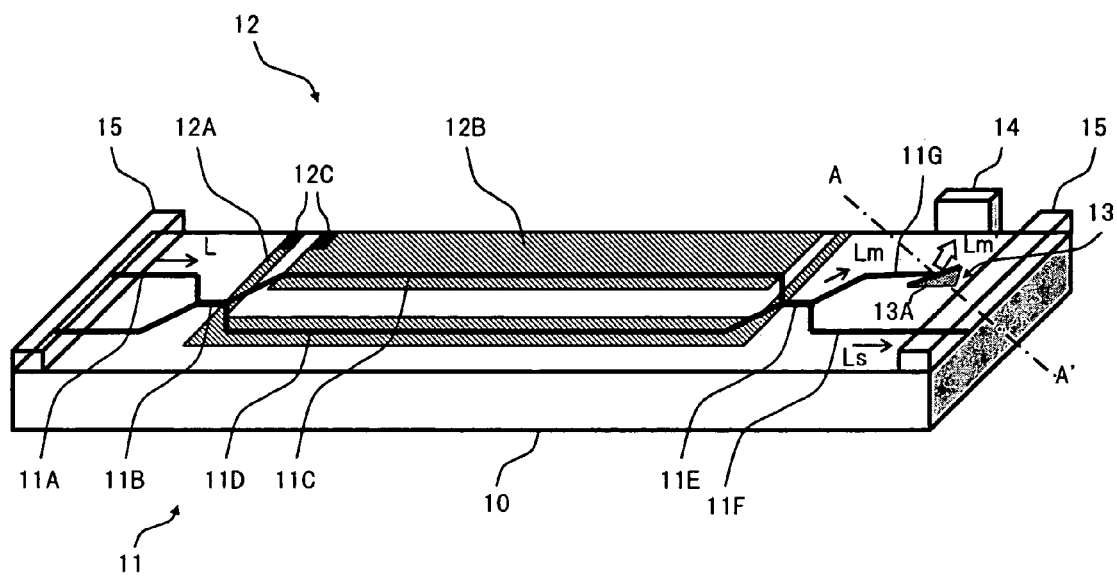
FIG. 1 is a perspective view showing a configuration of an optical waveguide device according to a first embodiment of the present invention.

Hereinafter, embodiments of an optical waveguide device according to the present invention will be described with reference to appended drawings. The same reference numerals denote the same or equivalent parts in all drawings.

FIG. 1 is a perspective view showing a configuration of an optical waveguide device according to a first embodiment of the present invention.

In FIG. 1, the optical waveguide device in the present embodiment comprises: a Mach-Zehnder optical waveguide 11 formed on the surface of a substrate 10; an electrode 12 formed on the surface of the substrate 10 along the optical waveguide 11; a reflecting groove 13 formed in the vicinity of an end portion on the monitor light output side of the optical waveguide 11; a light receiving element 14 receiving a monitor light which is reflected by the reflecting groove 13 to be emitted from a side face of the substrate 10; and block members 15 preventing influences of the chipping on optical input and output ends.

As the substrate 10, a LN substrate of Z-cut or the like is used for example. The optical waveguide 11 comprises: an input waveguide 11A; an input side coupler 11B; parallel waveguides 11C and 11D; an output side coupler 11E; a main signal light output waveguide 11F; and a monitor light output waveguide 11G, to thereby constitute a Mach-Zehnder interferometer. The input waveguide 11A has one end facing one end face (side face on the left side of FIG. 1) of the substrate 10, through which a light L is input, and the other end connected with one of two input ports of the input side coupler 11B. The input side coupler 11B branches the light L from the input waveguide 11A into two, to give the branched lights to the respective parallel waveguides 11C and 11D. The output side coupler 11E multiplexes the lights propagated through the parallel waveguides 11C and 11D, and then branches the multiplexed light into a main signal light Ls and a monitor light Lm, to give the main signal light Ls to the main signal light output waveguide 11F and the monitor light Lm to the monitor light output waveguide 11G. Herein, as each of the input side coupler 11B and the output side coupler 11E, a directional coupler or a multi-mode interference (MMI) coupler is used, for example.

The electrode 12 comprises: electrode patterns 12A and 12B; and electrode pads 12C, for example. The electrode pattern 12A is patterned in a required shape passing over the parallel waveguide 11D. On the other hand, the electrode pattern 12B is patterned in a required shape passing over the parallel waveguide 11C with a fixed distance from the electrode pattern 12A. The electrode pads 12C are equivalent to terminals for applying a high frequency electric signal to the electrode patterns 12A and 12B, and herein are disposed in the vicinity of a substrate side face (side face on the back side of FIG. 1) from which the monitor light is led out. Note, in the case where one of the electrode patterns is used as a ground electrode, the electrode pad for the corresponding electrode pattern is connected to an earth terminal.

The reflecting groove 13 is configured such that, by disposing a desired shaped groove on a predetermined position on the surface of the substrate 10 by utilizing a photo-lithography method for example, a reflecting plane 13A reflecting the monitor light Lm radiated from a terminal end of the monitor light output waveguide 11G to the inside of the substrate 10 is formed, and a reflected light Lm' reflected by the reflecting plane 13A is propagated toward the substrate side face (side face on the back side of FIG. 1). As shown in a A-A' cross-section of FIG. 2 for example, this reflecting groove 13 is slanted to a vertical direction of the substrate 10, and therefore, the reflected light Lm' of the monitor light Lm propagated along the surface of the substrate 10 is propagated while slightly deviating to the underside of the substrate 10.

Figure 2:
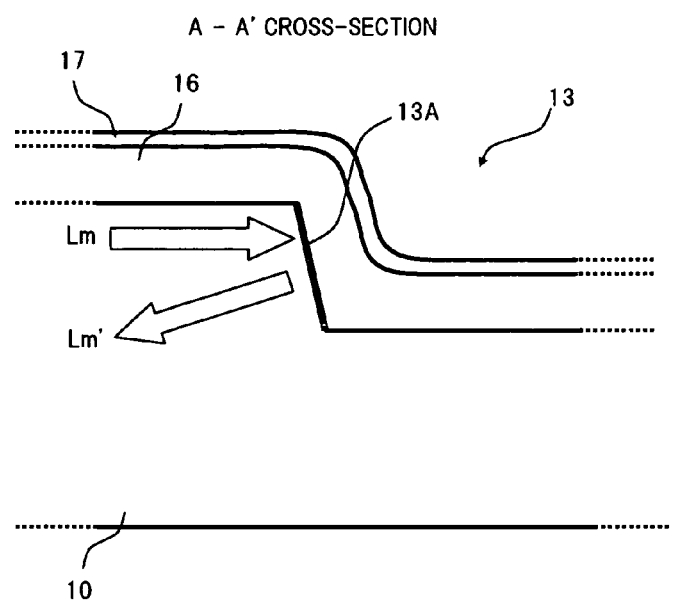
FIG. 2 is an enlarged view of A-A' cross-section of FIG. 1.

Note, in FIG. 2, numeral 16 shows a buffer layer formed on the entire surface of the substrate 10, and numeral 17 shows a Si film formed on the buffer layer 16. The buffer layer 16 is for realizing the prevention of optical absorption loss by the electrode 12 and the impedance matching, and is specifically formed of $SiO_2$ or the like. The Si film 17 is for suppressing the temperature drift.

The light receiving element 14 receives the monitor light Lm' which is reflected by the reflecting groove 13 to be emitted from the substrate side face, to generate an electric signal which is changed according to the power of the monitor light Lm'. This light receiving element 14 can be arranged on an arbitrary position at which the monitor light Lm' emitted from the substrate side face can be received, and may be attached to the substrate side face for example, or may be mounted to a position apart by a required distance from the substrate side face.

In order to prevent the chipping as described above, which is generated on the surface of the substrate 10, from influencing on the input and output lights, the block members 15 are configured such that, glasses, LN blocks or the like are attached to upper portions of opposite side faces (side faces on the left and right sides of FIG. 1) of the substrate 10. However, these block members 15 can be omitted in the case where the influences of the chipping on the input and output lights are small.

Figure 20:
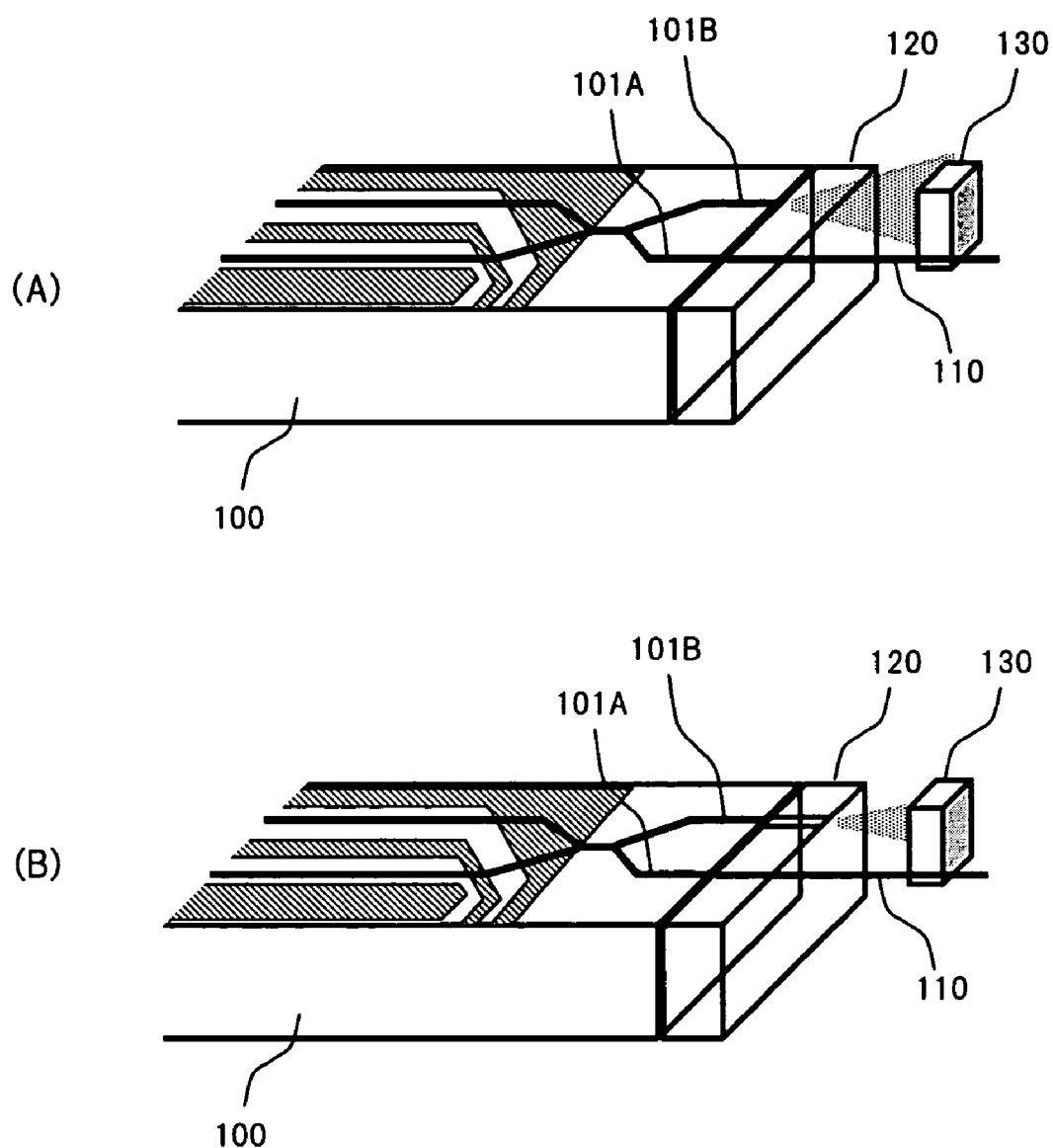
FIG. 20 is a diagram for explaining problems in a conventional butt joint type optical waveguide device.

On the side face of the substrate 10, from which the main signal light Ls is output, although not shown in the figure, there is disposed a fiber fixing member (for example, a V-groove fiber block, glass ferrule or the like) for fixing an output optical fiber to be butt jointed to one end of the main signal light output waveguide 11F (refer to FIG. 20).

There will be specifically described a manufacturing method of the optical waveguide device as described in the above.

Figure 3:
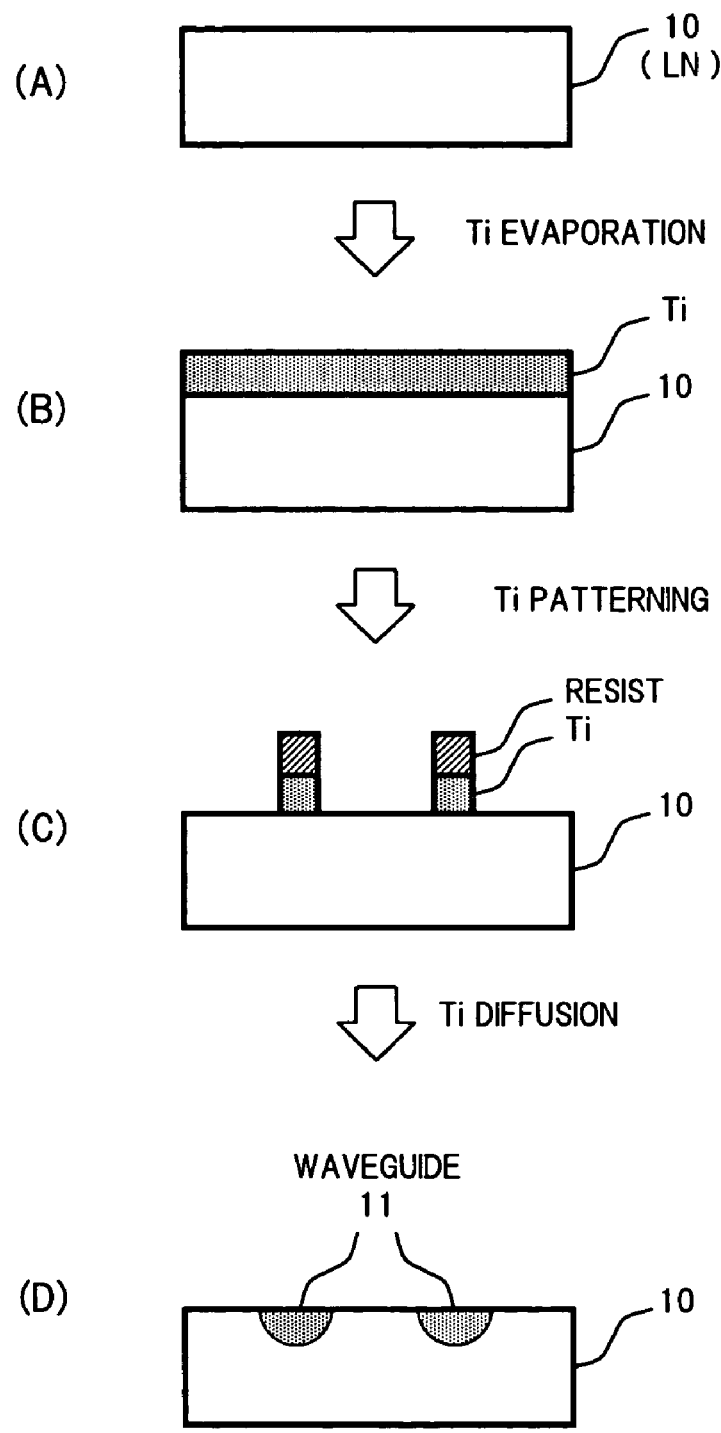
FIG. 3 is a diagram showing the forming process of an optical waveguide in the first embodiment.

Firstly, the optical waveguide 11 is formed on the LN substrate 10 in accordance with each process shown in FIG. 3 for example. To be specific, titanium (Ti) or the like, which is to be the optical waveguide 11, is evaporated on the LN substrate 10, to form a Ti film of about 1000 Å (refer to (A) and (B) of FIG. 3). Then, the photo-resist is applied on the Ti film by around 1 μm. Thereafter, the patterning of the resist is performed corresponding to the Mach-Zehnder interferometer by a typical photo lithography method, and further, the patterning of the Ti film is performed using the resist as the mask (refer to (C) of FIG. 3). Note, when the above patterning is performed, the dry etching may be applied or the wet etching may be applied. When the patterning of the Ti film is completed, Ti is diffused to the inside of the LN substrate 10 at 1000° C. to 1100° C., to form the Mach-Zehnder optical waveguide 11 in the vicinity of the substrate surface (refer to (D) of FIG. 3).

In the above forming process, there has been shown one example in which Ti is thermally diffused to form the optical waveguide 11 on the LN substrate 10. However, for example, Mg may be used in place of Ti. Further, it is also possible to form the optical waveguide 11 using a proton exchanging method, after the Ti film is patterned.

Figure 4:
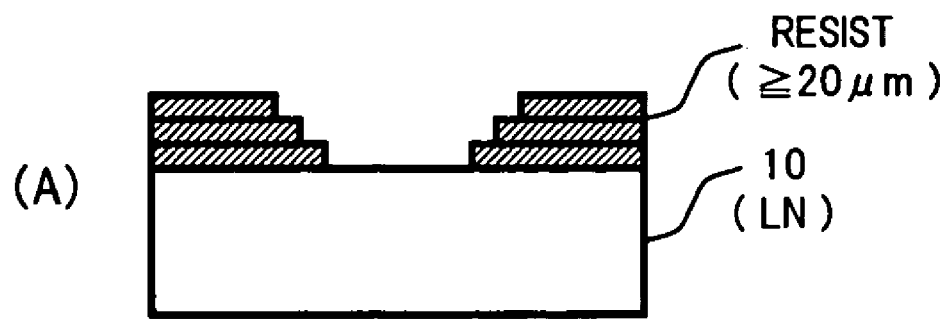
FIG. 4 is a diagram showing the forming process of a reflecting groove in the first embodiment.
Figure 4:
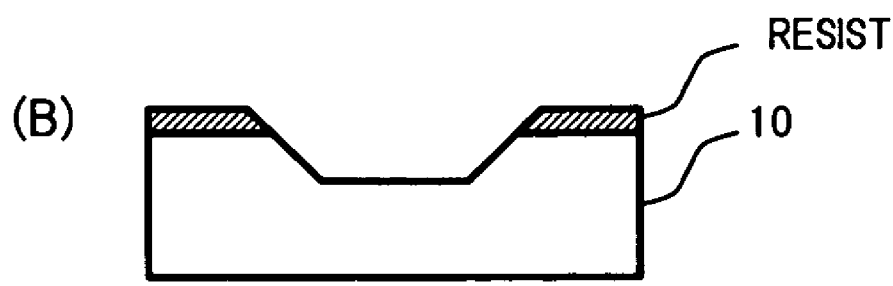
Figure 4:
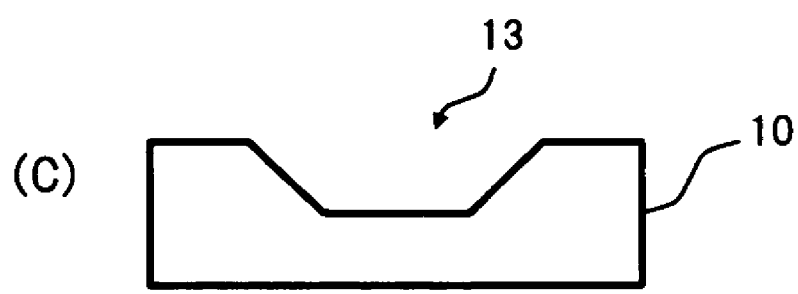

Next, the reflecting groove 13 is formed in accordance with each process shown in FIG. 4 for example. Firstly, similarly to the case of forming the optical waveguide 11, the pattern for forming the reflecting groove is created on a predetermined position on the substrate 10 by the photo lithography method. At that time, in order to form the reflecting plane 13A of the reflecting groove 13 to be slanted to the vertical direction of the substrate 10, for example, each resist is shifted stepwise to realize the slanted resist (refer to (A) of FIG. 4). Then, the reflecting groove 13 is formed on the substrate 10 by the dry etching, using this slanted resist as the mask (refer to (B) of FIG. 4). At this time, since the resist is formed in a slanted shape, each side wall of the reflecting groove 13 is formed in a slanted shape (refer to (C) of FIG. 4).

Figure 5:
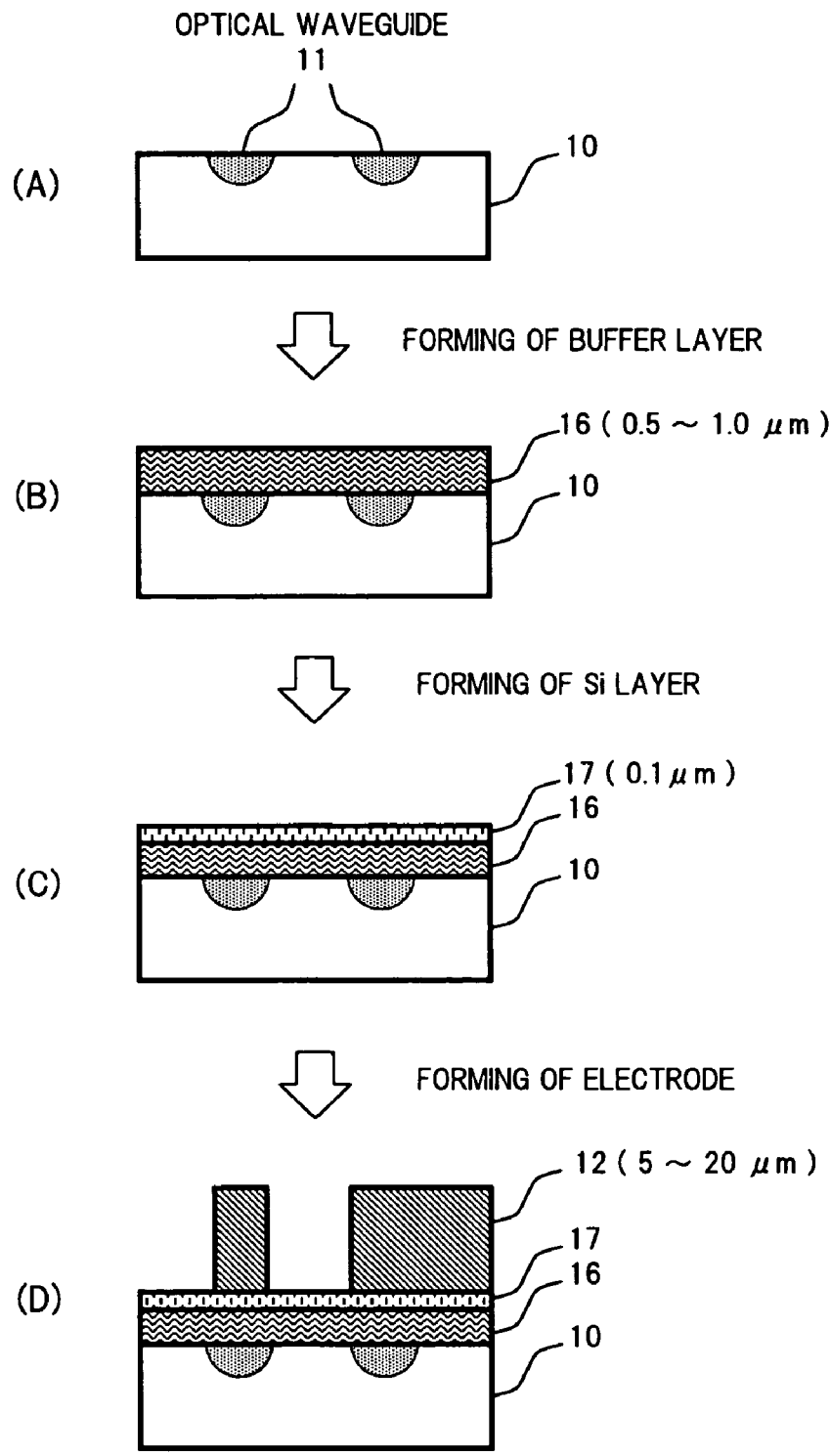
FIG. 5 is a diagram showing the forming process of an electrode in the first embodiment.

When the forming of the optical waveguide 11 and the forming of the reflecting groove 13 are completed, next, the electrode 12 is formed in accordance with each process shown in FIG. 5 for example. Firstly, the buffer layer 16 for preventing the optical absorption loss by the electrode and also for matching the impedance is formed on the surface of the substrate 10 using the sputtering, an electron beam (EB) evaporator or the like (refer to (A) and (B) of FIG. 5). The thickness of the buffer layer is optimized according to a necessary band or an electric reflection amount, but is typically 0.5 μm to 1.0 μm. When the buffer layer 16 is formed, the Si film 17 for suppressing the temperature drift is evaporated on the buffer layer 16 by the sputtering or the like (refer to (C) of FIG. 5). The thickness of the Si film 17 may be around 0.1 μm. Next, gold (Au) is evaporated as a ground for forming the electrode. The evaporation of gold is performed with the thickness of about 0.1 μm using the EB evaporator or the like. Then, similarly to the case of forming the optical waveguide 11, the etching is performed after the patterning of the resist, and further, the gold plating for the electrode is performed (refer to (D) of FIG. 5). Similarly to the thickness of the buffer layer, the thickness of the gold plating is also optimized according to the necessary band or the electric reflecting amount, but is typically about 5 to 20 μm.

Figure 6:
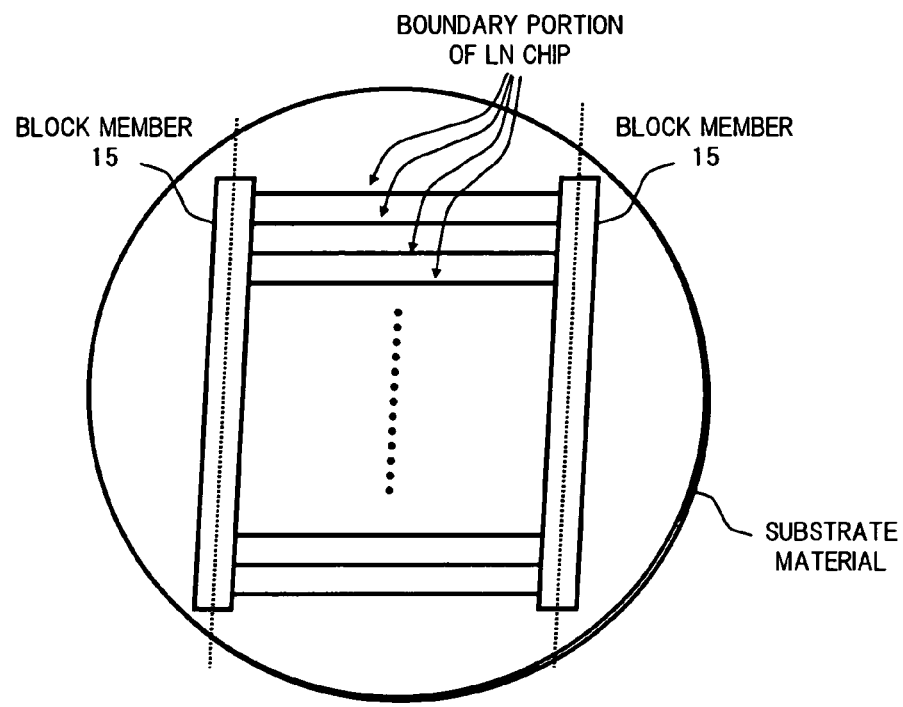
FIG. 6 is a diagram of a substrate material before a LN chip is cut out in the first embodiment.

When the forming of the optical waveguide 11, the reflecting groove 13, the buffer layer 16, the Si film 17 and the electrode 12 on the substrate 10 is completed as in the above manner, next, the block members 15 for preventing the chipping are attached to the upper portions of the optical input and output ends of the substrate 10. FIG. 6 is a top view of the substrate material to which the block members 15 are attached. Dotted line portions on the block members and boundary portions of the respective LN chips of the substrate material are cut out by utilizing a dicing apparatus, and thereafter, the light receiving element 14 is mounted to a predetermined position on the substrate side face from which the monitor light is led out.

In the optical waveguide device manufactured in accordance with the series of process as described above, the light L given to the optical input side face of the substrate 10 is propagated through the input waveguide 11A, to be branched into two by the input side coupler 11B, and the branched lights are propagated through the parallel waveguides 11C and 11D. At this time, a phase difference is given between the lights propagated through the parallel waveguides 11C and 11D according to electric signals applied to the electrode patterns 12A and 12B, so that the respective lights are multiplexed by the output side coupler 11E, and then, the multiplexed light is branched into the main signal light Ls and the monitor light Lm. The main signal light Ls is propagated through the main signal light waveguide 11F to be emitted from the side face of the substrate 10, and is led to the output optical fiber which is butt jointed to an end face of the main signal light waveguide 11F.

On the other hand, the monitor light Lm branched by the output side coupler 11E is propagated through the monitor light output waveguide 11G to be radiated from an end face of the monitor light output waveguide 11G to the inside of the substrate 10, and reaches the reflecting plane 13A of the reflecting groove 13 to be reflected. Since the reflecting plane 13A is slanted to the vertical direction of the substrate 10 as shown in FIG. 2, the monitor light Lm' reflected by the reflecting plane 13A is propagated within the substrate 10 toward a direction deviated to the underside of the surface of the substrate 10, to be led out to the substrate side face which is different from the side face from which the main signal light Ls is emitted. Therefore, the monitor light Lm' reached the substrate side face is emitted from a position below the chipping generated on the substrate surface, and accordingly, is received by the light receiving element 14 without the influence of the chipping. Note, since the chipping is generated not only on the substrate surface but also on the substrate rear face, it is desirable to set a gradient angle of the reflecting plane 13A so that the monitor light Lm' reached the substrate side face is led out from an intermediate position between the chippings on the substrate surface and the substrate rear face.

Then, in the light receiving element 14, the received monitor light Lm' is converted into an electric signal, and this electric signal is sent to a control section and the like (not shown in the figure), to be utilized for a feedback control of an operating point or the like of the optical waveguide device.

According to the optical waveguide device in the first embodiment, the reflecting groove 13A is disposed ahead of the monitor light output waveguide, so that the monitor light Lm is reflected. Thus, it becomes possible to lead out the monitor light Lm' to the substrate side face which is different from the substrate side face from which the main signal light Ls is emitted, without getting the substrate size larger. As a result, even in the case of the butt joint type optical waveguide device, the sufficient monitor light can be received by the light receiving element 14, and accordingly, it becomes possible to reliably perform the feedback control of the operating point or the like of the optical waveguide device. Further, the reflecting plane 13A, which is slanted to the vertical direction of the surface of the substrate 10, is formed so that, even if the chipping is generated on the substrate side face from which the monitor light is led out, the monitor light is emitted from the position below the chipping. Therefore, it is possible to avoid the reduction of the monitor light by the influence of the chipping. Moreover, the monitor light is led out to the substrate side face which is positioned on the same side as the electrode pad 12C of the electrode 12, so that the interface with the outside of the electric signal wiring can be collected to one side face of the substrate 10. Therefore, it becomes possible to effectively mount the optical waveguide device to an external circuit or the like. Such an optical waveguide device is useful for an optical modulator, an optical switch, a variable optical attenuator or the like, for example.

Figure 7:
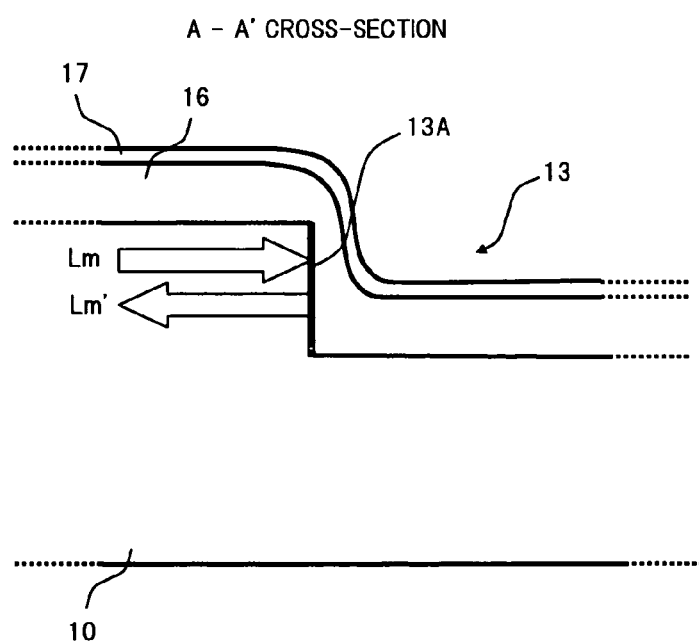
FIG. 7 is a cross-section view showing another configuration example of the reflecting groove relating to the first embodiment.
Figure 8:
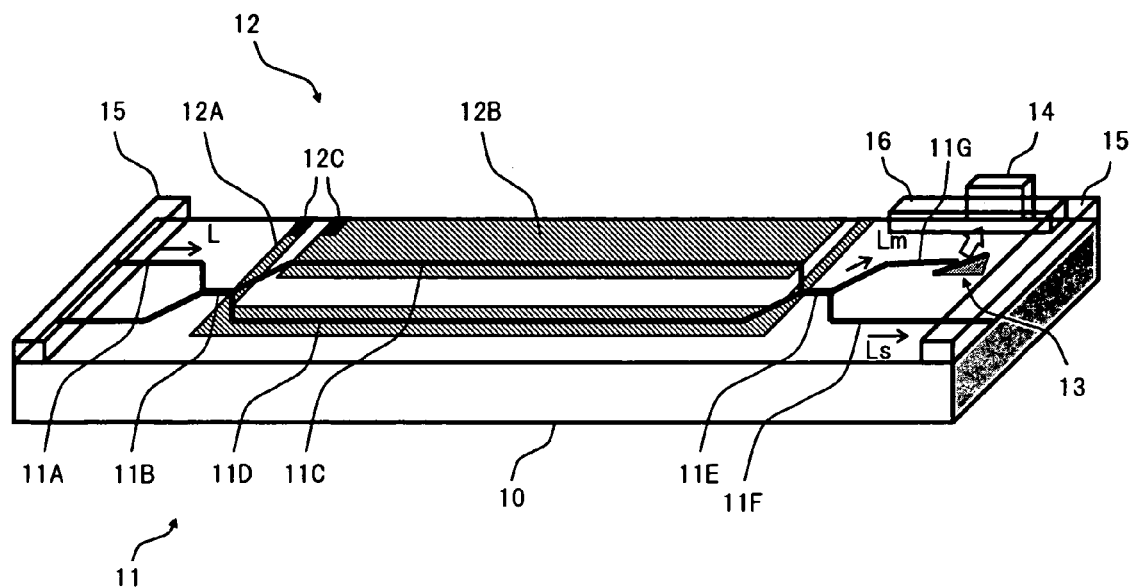
FIG. 8 is a perspective view showing an application example of the optical waveguide device relating to the reflecting groove in FIG. 7.
Figure 9:
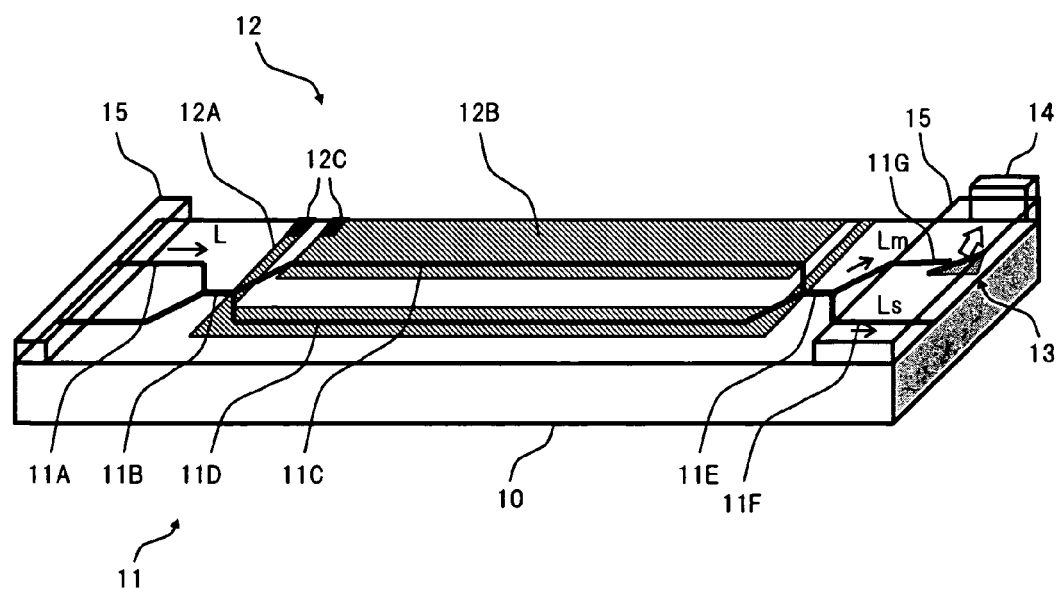
FIG. 9 is a perspective view showing an improved example relating to the application example in FIG. 8

In the first embodiment, the configuration has been such that the slanted reflecting plane 13A is disposed considering the influence of the chipping on the substrate side face from which the monitor light is led out. However, in the case where the influence of the chipping is slight, the configuration may be such that the reflecting plane 13A is formed to be vertical to the surface of the substrate 10 as shown in a A-A' cross-section view of FIG. 7 for example, so that the monitor light Lm' reflected by the reflecting plane 13A is propagated along the substrate surface. Further, as an application example of the case where the vertical reflecting plane 13A as shown in FIG. 7 is disposed, as shown in FIG. 8 for example, if the block members 15 is attached to the upper portion of the substrate side face from which the monitor light is led out, it becomes possible to suppress the influence of the chipping on the monitor light, similarly to the side face from which the main signal light Ls is output. In this case, since the light receiving element 14 can be attached to the substrate side face by utilizing the block member 15, it becomes also possible to readily mount the light receiving element 14 and further to improve the reliability. Moreover, as shown in FIG. 9 for example, the shape of the block member 15, the arrangement of the reflecting groove 13 and the like are designed so that the monitor light is led out from the substrate side face which is positioned below the block member 15 disposed on the upper portion of the side face from which the main signal light Ls is output. Thus, it becomes possible to reduce the number of parts of the block member to thereby achieve the cost reduction. In addition, in the configurations of FIG. 8 and FIG. 9, if the block member having the thickness of 300 μm or above is used, since the entire face of the light receiving element 14 can be attached to the substrate side face and the block member, it becomes possible to further stably attach the light receiving element 14.

Figure 10:
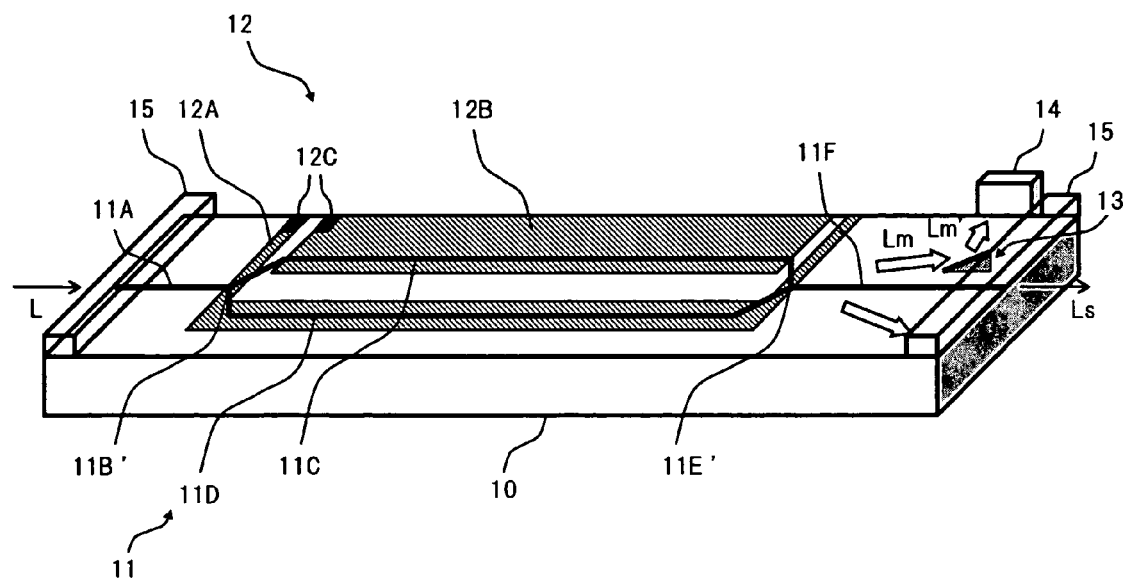
FIG. 10 is a perspective view showing a configuration example in the case where a Y-branch coupler is used, relating to the first embodiment.

Further, in the first embodiment, the description has been made on the case where the directional coupler or the MMI coupler is used as each of the input side coupler 11B and the output side coupler 11E which constitute the Mach-Zehnder optical waveguide 11. However, as shown in FIG. 10 for example, the present invention is also effective for the case where Y-branch couplers 11B' and 11E' are used to constitute the Mach-Zehnder optical waveguide 11. In this case, when a phase difference of π×odd number is given to the lights propagated through the parallel waveguides 11C and 11D, the respective lights are multiplexed by the output side coupler 11E', to be offset to each other, and the main signal light Ls becomes in an OFF state. At this time, the lights offset to each other are leaked out to the outside of the output waveguide 11F to be radiated to the inside of the substrate 10. A part of the radiation mode light propagated within the substrate 10 outside the output waveguide 11F (light radiated to the inside of the substrate on the back side of the output waveguide 11F in FIG. 10) is reflected by the reflecting groove 13 as the monitor light Lm, and the reflected light Lm' is led out to the substrate side face which is different from the side face from which the main signal light Ls is output, so that the function and effect similar to those in the first embodiment can be achieved.

Next, there will be described a second embodiment of the present invention.

Figure 11:
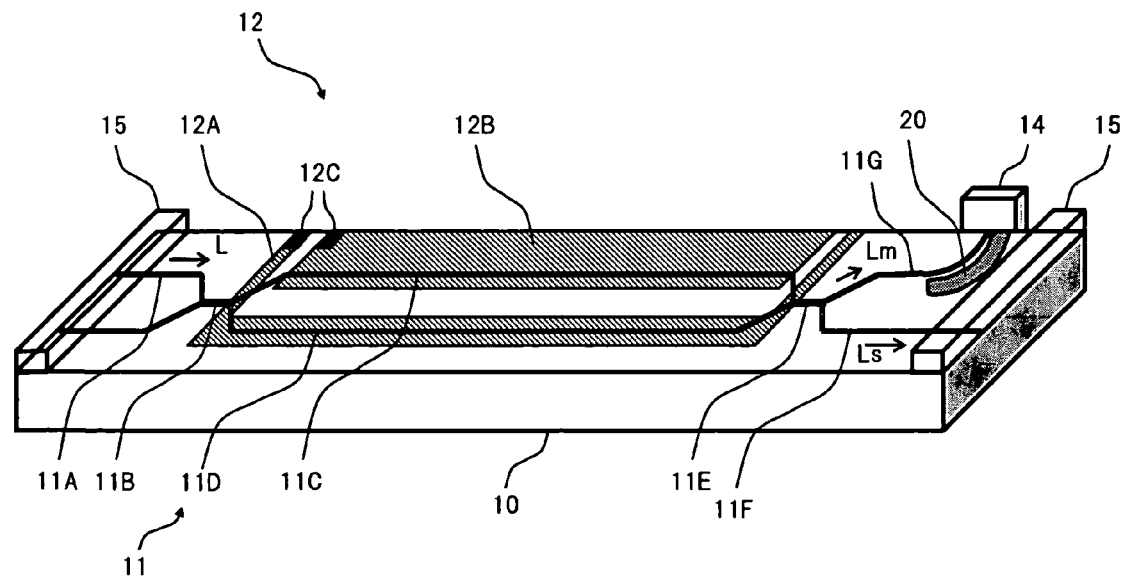
FIG. 11 is a perspective view showing a configuration of an optical waveguide device according to a second embodiment of the present invention.

FIG. 11 is a perspective view showing a configuration of an optical waveguide device according to the second embodiment.

In FIG. 11, the configuration of the optical waveguide device in the present embodiment differs from that in the first embodiment shown in FIG. 1 in that a curved waveguide having small curvature radius is applied as the monitor light output waveguide 11G, and also a groove portion 20 is formed on the radially outside of the curved waveguide. Configurations other than the above are similar to those in the first embodiment. Therefore, here, there will be described in detail the configurations of the monitor light output waveguide 11G and the groove portion 20.

Figure 12:
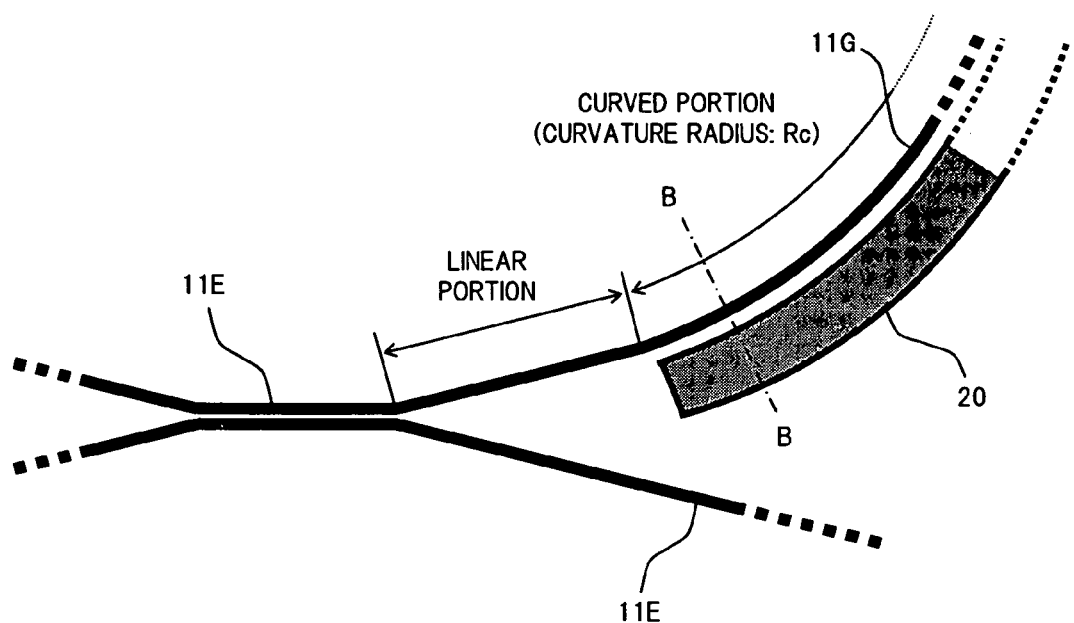
FIG. 12 is an enlarged top view showing the vicinity of an output side coupler and a monitor light output waveguide.
Figure 13:
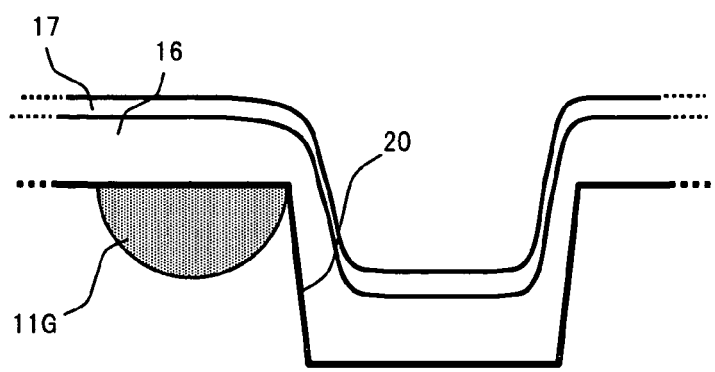
FIG. 13 is an enlarged view showing B-B' cross-section of FIG. 12.
Figure 13:
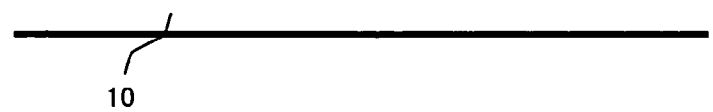

FIG. 12 is an enlarged top view showing the vicinity of the output side coupler 11E and the monitor light output waveguide 11G in FIG. 11. Further, FIG. 13 is a diagram showing a B-B' cross-section in FIG. 12.

As shown in FIG. 12, the monitor light output waveguide 11G comprises a linear portion connected with one of output ports of the output side coupler 11E and a curved portion connected with a front edge of the linear portion. Here, the curved portion of the monitor light output waveguide 11G has a fixed curvature radius Rc, and a front edge thereof extends to the substrate side face which is different from the side face from which the main signal light is output. The above described curvature radius Rs is set to have a small value of about 0.5 to 5 mm, so that, even if the substrate 10 having the narrow width is used, the monitor light is not totally reflected by the substrate side face, without getting the substrate size larger.

The groove portion 20 is formed by removing the surrounding substrate 10 positioned on the radially outside of the curved waveguide along a longitudinal direction of the curved waveguide. As shown in the B-B' cross-section of FIG. 13 for example, in this groove portion 20, an upper end of one of side walls formed by removing the substrate 10 is in contact with the monitor light output waveguide 11G. Such a groove portion 20 increases a confining effect of the monitor light propagated through the curved waveguide of small curvature radius Rc.

Here, there will be specifically described the confining effect of the monitor light by the above described groove portion 20.

Figure 14:
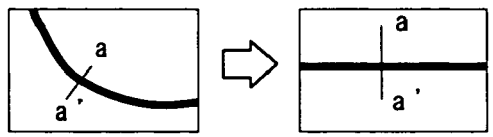
FIG. 14 is a diagram showing a simulation result for verifying a confining effect of monitor light in the second embodiment.
Figure 14:
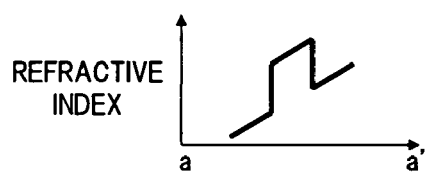
Figure 14:
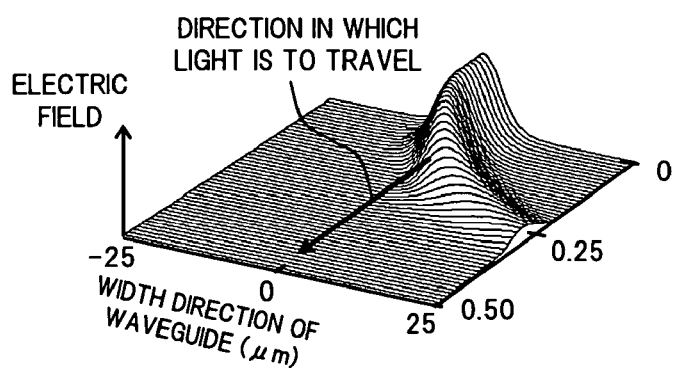
Figure 14:
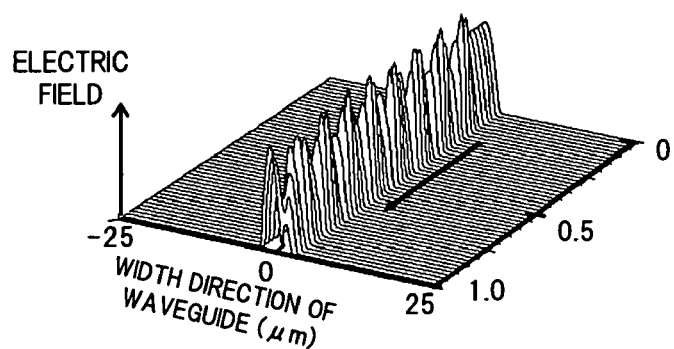
Figure 21:
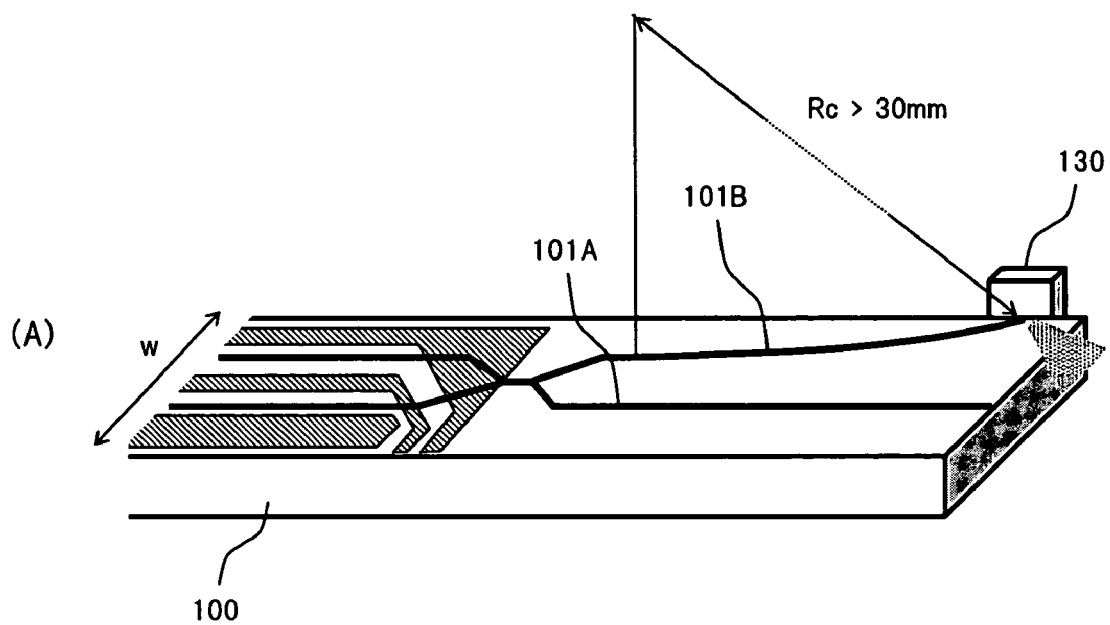
FIG. 21 is a diagram for explaining problems in the case where a curved waveguide is applied.
Figure 21:
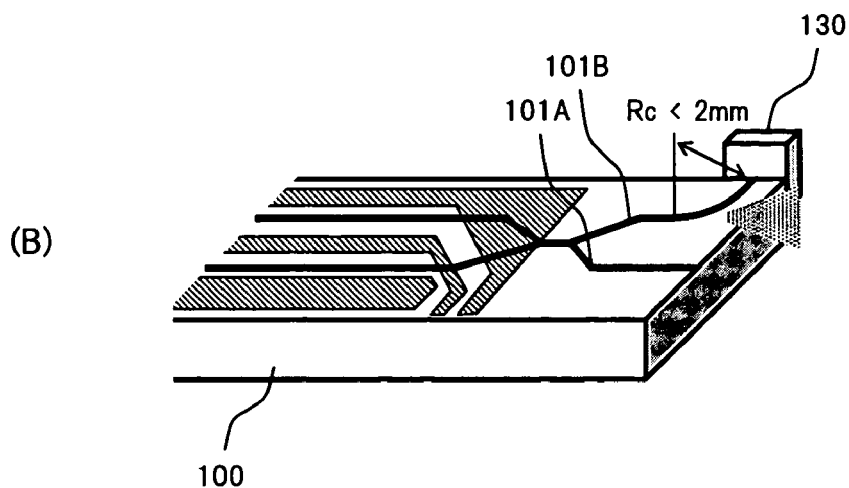
Figure 22:
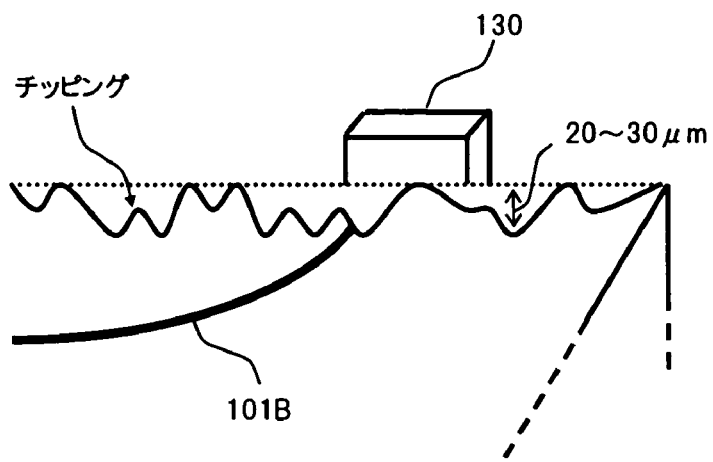
FIG. 22 is a diagram for explaining an influence of the chipping on a monitor light.
Figure 23:
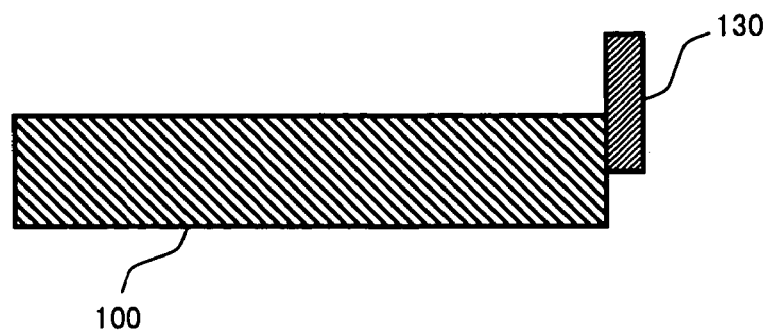
FIG. 23 is a diagram for explaining problems of a conventional monitor light receiving element mounting method.
Figure 15:
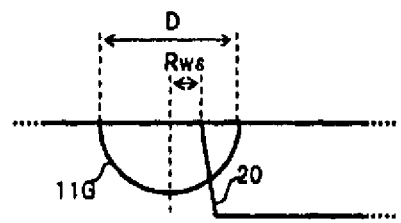
Figure 15:
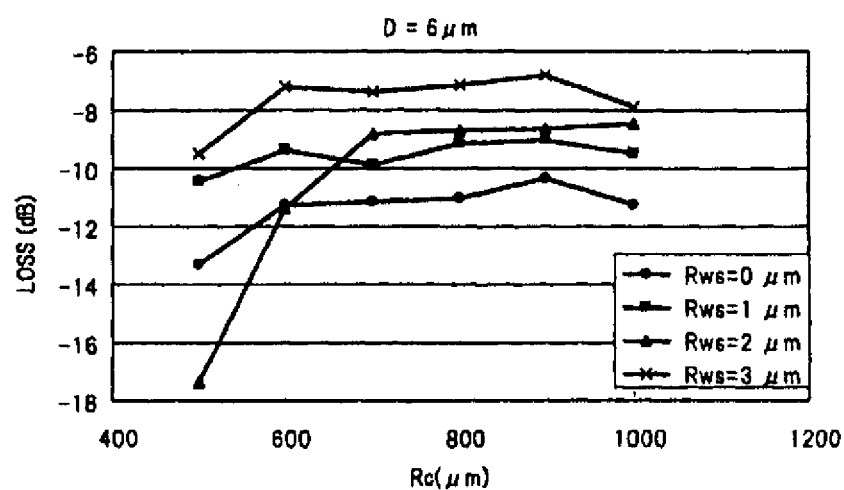
Figure 15:
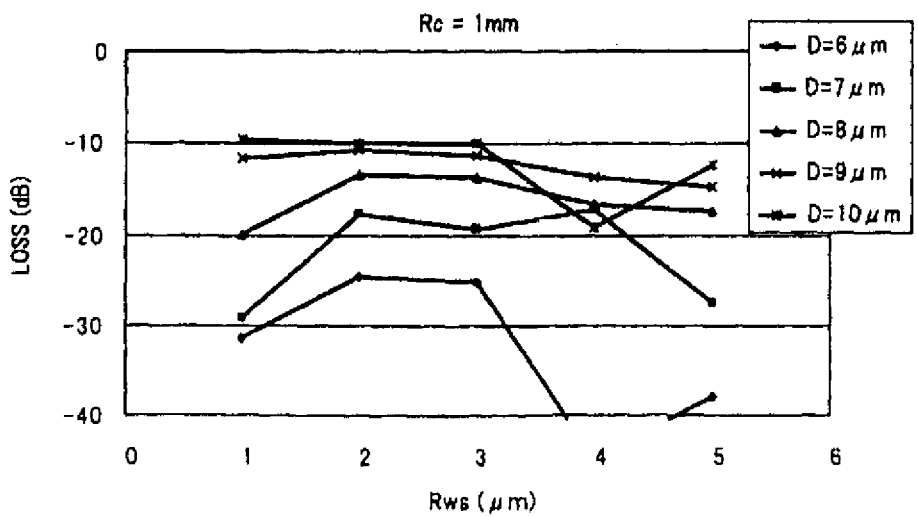

With regard to the curved waveguide of small curvature radius Rc as shown in (B) of FIG. 21, it is important to reduce infinitely an occurrence of radiation loss. As one method for achieving the reduction of radiation loss, it is effective to reduce a refractive index of the periphery of the curved waveguide to enhance the optical confining effect in the curved waveguide. To be specific, in the case of the curved waveguide formed on the LN substrate, a refractive index of the LN substrate surrounding the periphery of the curved waveguide is typically 2.1 to 2.2, and it becomes possible to reduce the radiation loss by reducing this refractive index to a maximum extent. Therefore, in the second embodiment, the LN substrate on the periphery of the curved waveguide, in particular, the LN substrate positioned on the radially outside of the curved waveguide, is removed to form the groove portion 20, so that the refractive index of the groove portion 20 is reduced ideally to an air refractive index of 1.0, thereby increasing the confining effect of the monitor light Lm propagated through the curved waveguide. Actually, as shown in the cross-section view of FIG. 13, the buffer layer 16 and the adhesive exist on the upper portion of the groove portion 20. However, since their refractive indexes are about 1.4 to 1.5 and are sufficiently lower than the refractive index of the LN substrate, the high optical confining effect is achieved. FIG. 14 shows one example verifying the above content by the simulation.

In the above simulation, as shown in the upper part of FIG. 14, the intensity of the light propagated through the waveguide is calculated by using the curved waveguide as a linear waveguide having the refractive index profile equivalent to that of the curved waveguide (refer to a change in refractive index in a-a' cross-section). The simulation result shown in the medium part of FIG. 14 is one example in which the calculation is performed, by setting a conventional curved waveguide as shown in (B) of FIG. 21 to have the curvature radius of 1 mm, the waveguide width w of 7 μm, and the waveguide peripheral refractive index of 2.2. As shown in this simulation result, in the conventional curved waveguide, it is understood that most of the light is leaked out to the outside of the waveguide at the width of about 10 μm after propagation. On the other hand, the simulation result shown in the lower part of FIG. 14 is one example in which the calculation is performed, by setting the curved waveguide to have the curvature radius of 0.5 mm, the waveguide width of 5 μm, and the waveguide peripheral refractive index of 1.0, as one example of the case where the refractive index of the periphery of the curved waveguide is made lower. As shown in this simulation result, even in the case where the curvature radius is made smaller to 0.5 mm, the light is propagated along the curved waveguide, and accordingly, it is understood that the sufficient optical confining effect can be achieved.

Figure 15:
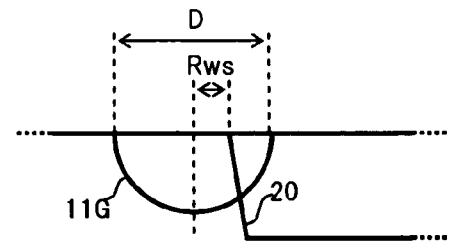
FIG. 15 is a diagram showing an experiment result for verifying the confining effect of monitor light in the second embodiment.
Figure 15:
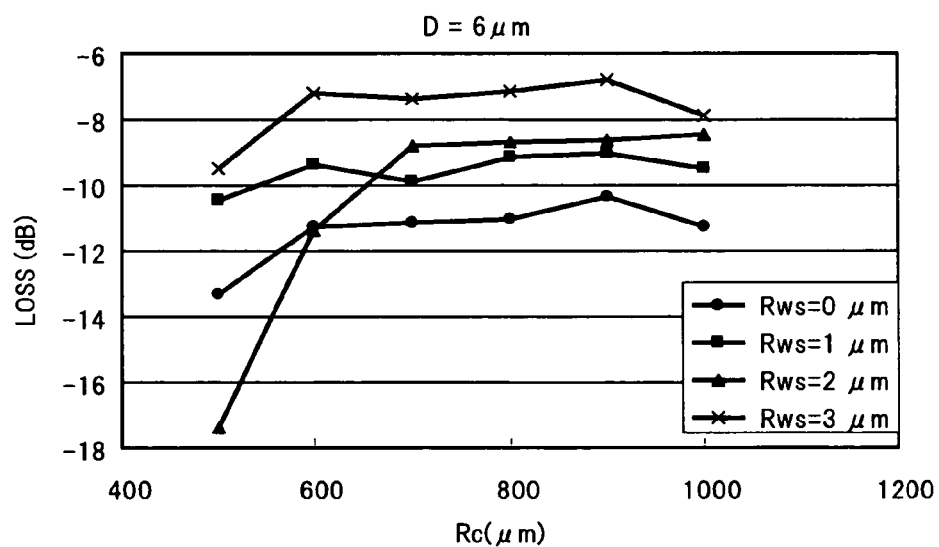
Figure 15:
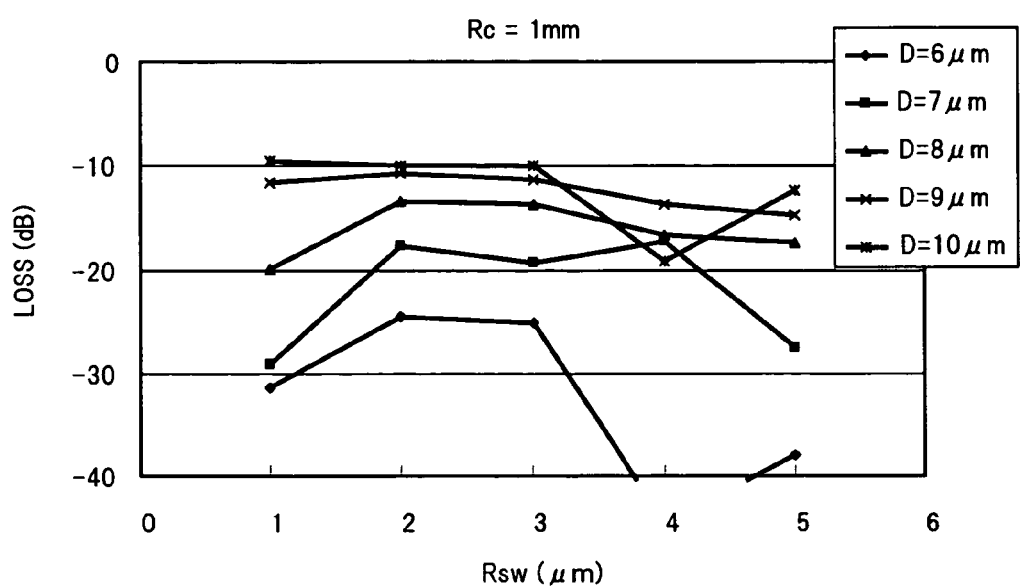

Further, the experiment result shown in FIG. 15 is one example in which how the radiation loss is changed is measured in the case where the forming position of the groove portion 20 on the radially outside of the curved waveguide is changed. In the experiment in this case, as shown in the upper part of FIG. 15, a distance between the center of the curved waveguide and an upper end of the side wall of the groove portion 20 is set to Rws, and a value of Rws and the curvature radius Rc of the curved waveguide are changed, to measure the loss in the curved waveguide. To be specific, the measurement data shown in the medium part of FIG. 15 summarizes the loss with respect to the curvature radius Rc, which is obtained when the width D of the curved waveguide is fixed to 6 μm and the distance Rws between the curved waveguide and the groove portion 20 is set stepwise in a range of 0 μm to 3 μm. It is understood from this measurement data that the loss is mostly reduced when the distance Rws is set to 3 μm, that is, in the case where the upper end of the side wall of the groove portion 20 is in a positional relationship to be in contact with the curved waveguide. Further, it is also understood that the loss can be suppressed to a relatively small value depending on the setting of the curvature radius Rc, when the distance Rws is set to be shorter than 3 μm, that is, even in a state where a portion of the curved waveguide is removed. Moreover, the measurement data shown in the lower part of FIG. 15 summarizes the loss with respect to the distance Rws, which is obtained when the curvature radius Rc is fixed to 1 mm, the curved waveguide width D is set stepwise in a range of 6 μm to 10 μm. As apparent in the case where the curved waveguide width is set to 6 μm for example, it is understood from this measurement data that the loss tends to be increased, when the distance Rws exceeds 3 μm, that is, when the state where the curved waveguide is in contact with the groove portion 20 (Rws=3 μm) is cancelled.

Based on the simulation result and the experiment result as described in the above, according to the optical waveguide device in the second embodiment, by forming the groove portion 20 to the curved waveguide of small curvature radius arranged on the latter half of the monitor light output waveguide 11C, the monitor light Lm propagated through the curved waveguide can be effectively confined within the waveguide, and in particular, if the groove portion 20 is disposed on the position in contact with the curved waveguide, it becomes possible to more effectively reduce the radiation loss at the curved portion of the monitor light output waveguide 11G Accordingly, similarly to the effect achieved in the first embodiment, the monitor light can be led out to the substrate side face which is different from the side face from which the main signal light Ls is emitted, without getting the substrate size larger, and accordingly, it becomes possible to receive the sufficient monitor light by the light receiving element 14 even in the case of the butt joint type optical waveguide device. Further, by leading out the monitor light to the substrate side face which is positioned on the same side of the electrode pad 12C of the electrode 12, the interface with the outside of the electric signal wiring can be collected to one side face of the substrate 10. Therefore, it becomes possible to effectively mount the optical waveguide device to an external circuit or the like. Such an optical waveguide device is useful for an optical modulator, an optical switch, a variable optical attenuator or the like, for example.

Figure 16:
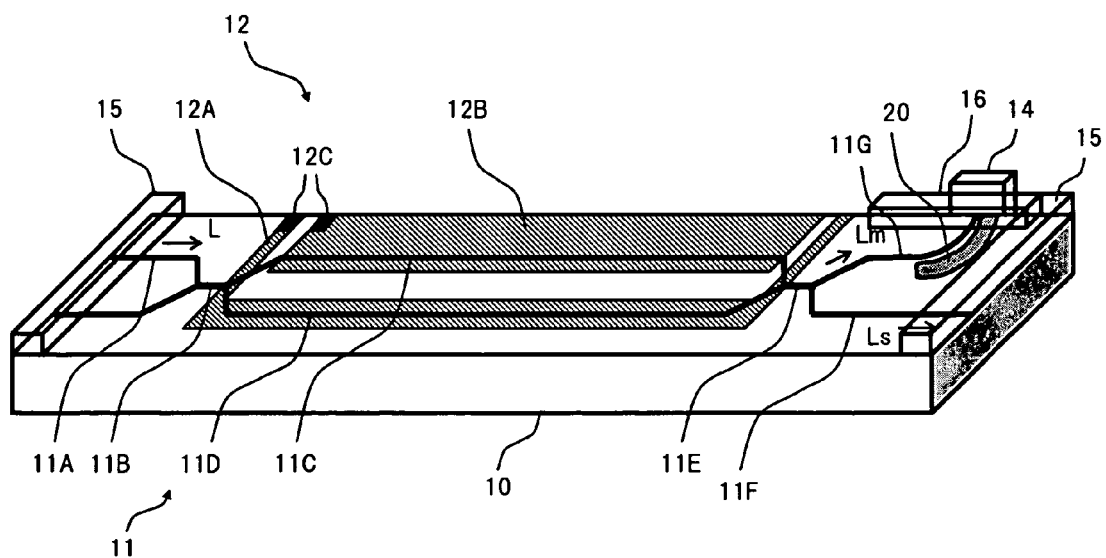
FIG. 16 is a perspective view showing an application example of the optical waveguide device relating to the second embodiment.
Figure 17:
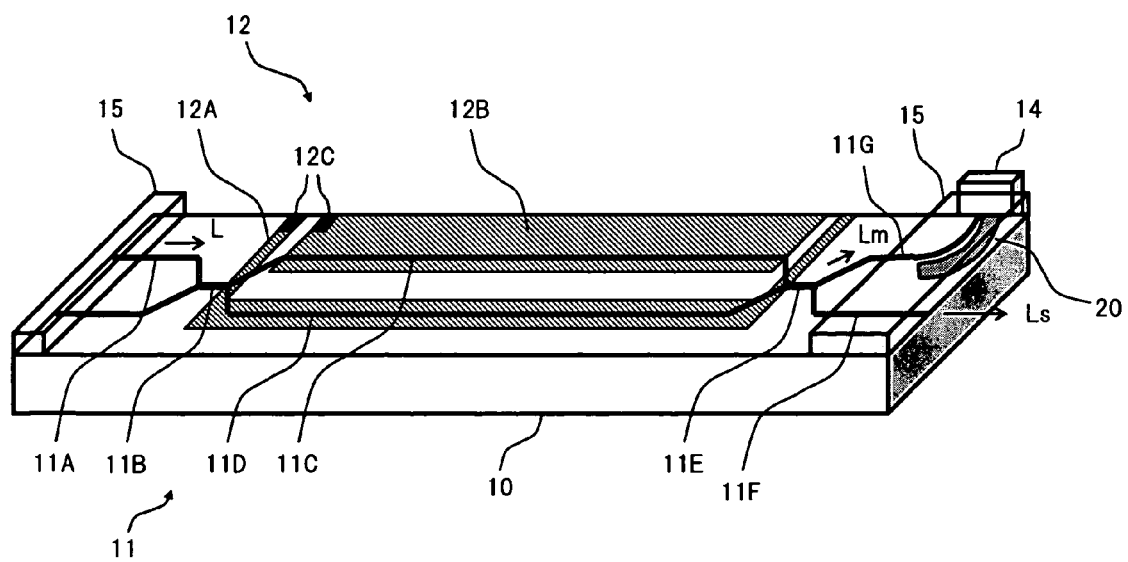
FIG. 17 is a perspective view showing an improved example relating to the application example in FIG. 16.

In the second embodiment, there has not been especially considered the influence of the chipping on the monitor light. However, similarly to the case shown in FIG. 8, it is surely possible to attach the block member 15 to the upper portion of the substrate side face from which the monitor light is led out, to suppress the influence of the chipping on the monitor light. Further, similarly to the case shown in FIG. 9, by designing the shapes of the block member 15 and the monitor light output waveguide 11G so that the monitor light is led out from the substrate side face positioned below the block member 15 which is disposed on the upper portion of the side face from which the main signal light Ls is output, it becomes possible to reduce the number of parts of the block member to thereby achieve the cost reduction. Configurations of application examples of the second embodiment corresponding to FIG. 8 and FIG. 9 are shown in FIG. 16 and FIG. 17, respectively.

In the second embodiment, the groove portion 20 is disposed only on the radially outside of the curved waveguide. However, it is also possible that a groove portion same as that on the radially outside of the curved waveguide is disposed on the radially inside of the curved waveguide, to form a curved waveguide having a cross-section same as that of a so-called ridge waveguide.

Figure 18:
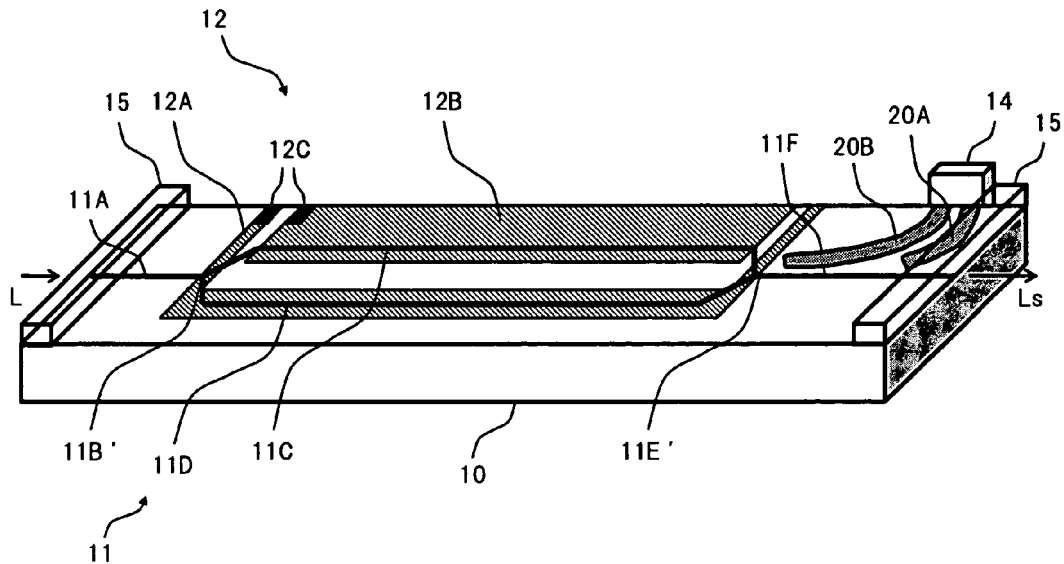
FIG. 18 is a perspective view showing a configuration example in the case where a Y-branch coupler is used, relating to the second embodiment.
Figure 19:
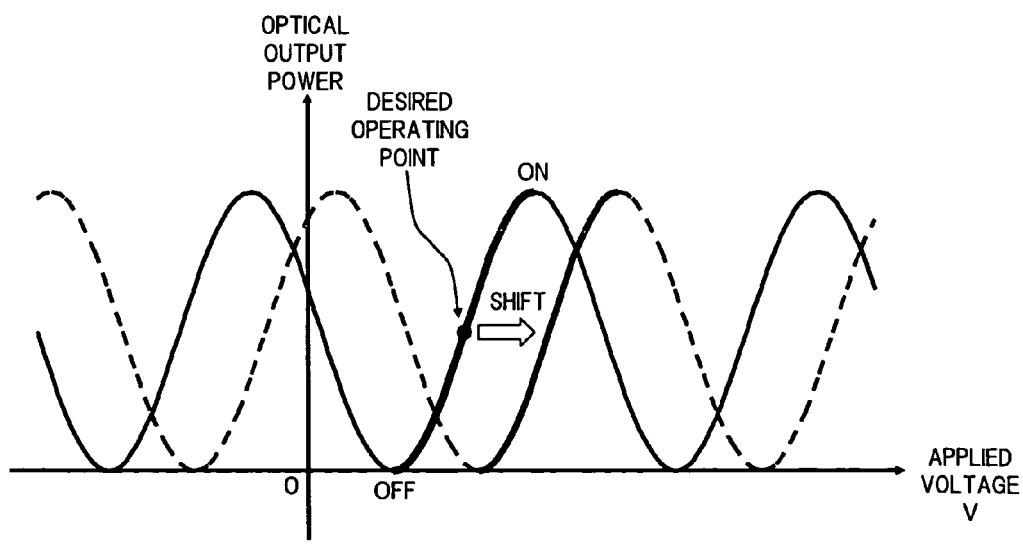
FIG. 19 is a diagram showing an optical output power characteristic of a typical Mach-Zehnder optical modulator.

In addition, the present invention can cope with an optical waveguide device using the Y-branch couplers as the input side coupler and the output side coupler which constitute the Mach-Zehnder optical waveguide 11, by applying the above described configuration in which the groove portions are formed on both sides of the curved waveguide. To be specific, as shown in FIG. 18 for example, in the optical waveguide device in which the Mach-Zehnder optical waveguide 11 is constituted by using the Y-branch couplers 11B' and 11E', a pair of curved groove portions 20A and 20B for leading out a part of the radiation mode light, which is leaked out to the outside of the output waveguide 11F when the main signal light Ls is in the OFF state, to the substrate side face as the monitor light, is formed on the LN substrate 10. The LN substrate portion positioned between the curved groove portions 20A and 20B has a refractive index (2.1 to 2.2) higher than those of the curved groove portions 20A and 20B, and therefore, functions as the curved waveguide for the monitor light. Thus, it becomes possible to achieve the function and effect similar to that in the second embodiment.

Further, in the first and second embodiments, in order to lead out the sufficient monitor light to the desired substrate side face, the reflecting groove 13 is formed on the substrate side face 10 and the groove portion 20 is disposed on the outside of the curved waveguide. Such configurations utilizing the reflecting groove 13 and the groove portion 20 are applicable to the case where the light other than the monitor light is led out to the desired substrate side face within the limited substrate size. For example, by applying a configuration same as that for the monitor light side is applied to the output waveguide on the main signal light Ls side in each of the above embodiments, it becomes possible to extract the main signal light Ls from the side face in the longitudinal direction within the LN substrate of narrow width.

In addition, in the first and second embodiments, there has been described one example in which the Z-cut LN substrate is used. However, the present invention is not limited thereto, and is effective for an optical waveguide device using an X-cut LN substrate. Furthermore, the present invention can be applied to optical waveguide devices using various types of substrates other than the LN substrate.

INDUSTRIAL APPLICABILITY

According to the present invention, since the groove is formed on the substrate to form the reflecting plane, or the groove portion is disposed on at least the radially outside of the curved waveguide, the optical waveguide device capable of leading out the light of sufficient power to the desired substrate side face without getting the substrate size larger can be provided, and also the optical waveguide device capable of avoiding the influence of the chipping which is generated in the vicinity of the substrate side face with the simple configuration can be realized. Such optical waveguide devices are useful as an optical modulator, an optical switch, a variable optical attenuator or the like, which is used in the optical communication system, and thus have large industrial applicability.

What is claimed is:

1. An optical device comprising:
   a lithium niobate substrate;
   an optical waveguide formed on the substrate;
   a groove formed in the vicinity of the optical waveguide, having a reflecting plane on a sidewall, slanted to a direction vertical to a surface of said substrate;
   wherein a light output from said optical waveguide is reflected by said reflecting plane and emitted from a side face of the substrate; and
   wherein a light reflected by the reflecting plane propagates inside the substrate, to a direction deviated to the underside of the substrate surface.

2. An optical device according to claim 1, wherein said optical waveguide comprises:
   an input waveguide; an input side coupler connected to said input waveguide;
   a pair of waveguides connected to said input side coupler;
   an output side coupler connected to said pair of waveguides; and
   an output waveguide connected to said output side coupler, to constitute a Mach-Zehnder interferometer, and said groove is formed in the vicinity of an end portion of said output waveguide, from which a monitor light is output, to lead out the monitor light reflected by said reflecting plane to the substrate side face.

3. An optical device according to claim 1,
wherein the reflecting plane of said groove is formed to be slanted to the direction vertical to the surface of said substrate, so that the reflected light is emitted from said substrate side face positioned in a region which is apart by previously set distances from the substrate surface and from the substrate rear face.

4. An optical device according to claim 1,
wherein a block member preventing the generation of a chipping on the substrate surface is provided on an upper portion of the substrate side face from which the light output from said optical waveguide and then reflected by said groove is emitted.

5. An optical device according to claim 2,
wherein block members preventing the generation of the chipping on the substrate surface are respectively provided on an upper portion of the substrate side face from which the monitor light output from said output waveguide and then reflected by said groove is emitted, and on an upper portion of a substrate side face from which a main signal light propagated through said output waveguide is emitted.

6. An optical device according to claim 5,
wherein the monitor light reflected by said groove is emitted from the substrate side face positioned below said block member corresponding to the main signal light side, so that said block member corresponding to the monitor light side is made common to the main signal light side.

7. An optical device according to claim 5, further comprising a light receiving element for receiving the monitor light,
wherein said light receiving element is attached to the substrate side face from which the monitor light is emitted, by utilizing said block member.

8. An optical device according to claim 2,
wherein said output side coupler is either a directional coupler or a multi-mode interference coupler, and
said output waveguide includes a main signal light output waveguide connected with a port of said output side coupler, from which a main signal light is output, and a monitor light output waveguide connected with a port of said output side coupler, from which the monitor light is output.

9. An optical device according to claim 2,
wherein said output side coupler is a Y-branch coupler, said output waveguide is connected with a multiplexing port of said Y-branch coupler, and a light leaked out to the outside of said output waveguide when a main signal light is in an OFF state is used as the monitor light.

10. An optical device according to claim 2, further comprising an electrode disposed corresponding to said pair of waveguides,
wherein the light reflected by said groove is emitted to the substrate side face on the side on which an electrode pad for applying an electric signal to said electrode from the outside is arranged.

* * * * *

UNITED STATES PATENT AND TRADEMARK OFFICE
CERTIFICATE OF CORRECTION

| | |
|---|---|
| PATENT NO. | : 7,386,198 B2 |
| APPLICATION NO. | : 11/248232 |
| DATED | : June 10, 2008 |
| INVENTOR(S) | : Yasuhiro Ohmori et al. |

It is certified that error appears in the above-identified patent and that said Letters Patent is hereby corrected as shown below:

In the drawings:

FIG. 15, lower graph, horizontal axis, change "Rsw" to --Rws--.

Signed and Sealed this

Fourteenth Day of April, 2009

JOHN DOLL
*Acting Director of the United States Patent and Trademark Office*